US012754848B2

(12) United States Patent
Pham et al.

(10) Patent No.: US 12,754,848 B2
(45) Date of Patent: Oct. 6, 2026

(54) SYSTEM AND METHOD FOR EARLY PREFETCH FOR MEMORY DEVICE

(71) Applicant: Samsung Electronics Co., Ltd., Gyeonggi-do (KR)

(72) Inventors: Tung Pham, San Jose, CA (US); Andrew Chang, Los Altos, CA (US)

(73) Assignee: Samsung Electronics Co., Ltd (KR)

( * ) Notice: Subject to any disclaimer, the term of this patent is extended or adjusted under 35 U.S.C. 154(b) by 20 days.

(21) Appl. No.: 18/748,359

(22) Filed: Jun. 20, 2024

(65) Prior Publication Data

US 2025/0077436 A1 Mar. 6, 2025

Related U.S. Application Data

(60) Provisional application No. 63/579,563, filed on Aug. 30, 2023, provisional application No. 63/579,568, filed on Aug. 30, 2023, provisional application No. 63/579,556, filed on Aug. 30, 2023.

(51) Int. Cl.

*G06F 12/0862* (2016.01)
*G06F 12/02* (2006.01)
*G06F 12/0891* (2016.01)

(52) U.S. Cl.

CPC ...... *G06F 12/0862* (2013.01); *G06F 12/0246* (2013.01); *G06F 12/0891* (2013.01); *G06F 2212/6026* (2013.01)

(58) Field of Classification Search

CPC ............. G06F 12/0862; G06F 12/0246; G06F 12/0891; G06F 2212/6026
See application file for complete search history.

(56) References Cited

U.S. PATENT DOCUMENTS

| | | | |
|---|---|---|---|
| 7,139,878 | B2 | 11/2006 | Malik et al. |
| 7,493,450 | B2 | 2/2009 | Bearden |
| 8,069,310 | B1 | 11/2011 | Levin-Michael et al. |
| 9,274,965 | B2 | 3/2016 | El-Mahdy et al. |
| 9,378,144 | B2 | 6/2016 | Dodson et al. |
| 9,606,926 | B2 | 3/2017 | Garg et al. |
| 10,298,496 | B1 | 5/2019 | Nakibly et al. |
| 10,552,343 | B2 | 2/2020 | Hermesh et al. |
| 10,664,942 | B2 | 5/2020 | Paltashev et al. |
| 10,866,897 | B2 | 12/2020 | Chang et al. |

(Continued)

FOREIGN PATENT DOCUMENTS

| | | |
|---|---|---|
| CN | 103135945 | 11/2014 |
| CN | 10756806 | 7/2020 |

(Continued)

*Primary Examiner* — Prasith Thammavong
(74) *Attorney, Agent, or Firm* — The Farrell Law Firm, P.C.

(57) ABSTRACT

A method and apparatus are provided for performing early prefetch in a memory system. A method includes receiving a data request including an address of a data page stored in a memory device; storing the data request at a first position in a request queue; accessing the data request stored at the first position and performing a first lookup operation for the data request; updating the device request queue, which includes moving the data request stored at the first position to a second position in the request queue; and accessing the data request stored at the second position and performing a second lookup operation for the data request.

22 Claims, 13 Drawing Sheets

(56) References Cited

U.S. PATENT DOCUMENTS

| | | | | |
|---|---|---|---|---|
| 11,093,404 | B2 * | 8/2021 | Gottin | G06F 12/0871 |
| 11,119,694 | B2 | 9/2021 | Yang et al. | |
| 11,372,762 | B2 | 6/2022 | Narsale | |
| 11,372,763 | B2 | 6/2022 | Narsale et al. | |
| 11,416,404 | B2 | 8/2022 | Pusdesris et al. | |
| 11,507,516 | B2 | 11/2022 | Roberts et al. | |
| 11,663,132 | B2 | 5/2023 | Pusdesris et al. | |
| 2006/0265552 | A1 * | 11/2006 | Davis | G06F 12/0862 711/137 |
| 2014/0108741 | A1 * | 4/2014 | Boettiger | G06F 12/0862 711/137 |
| 2015/0195371 | A1 * | 7/2015 | Nowakowski | G06F 3/04812 709/213 |
| 2016/0239432 | A1 * | 8/2016 | Zhuang | G06F 12/023 |
| 2019/0213130 | A1 | 7/2019 | Madugula et al. | |
| 2021/0390053 | A1 | 12/2021 | Roberts | |
| 2022/0318151 | A1 | 10/2022 | Kotra et al. | |
| 2023/0004318 | A1 | 1/2023 | Zhang et al. | |
| 2023/0049662 | A1 | 2/2023 | Do et al. | |
| 2023/0121686 | A1 | 4/2023 | Bondarenko et al. | |
| 2024/0111678 | A1 * | 4/2024 | Kotra | G06F 12/0888 |

FOREIGN PATENT DOCUMENTS

| | | |
|---|---|---|
| CN | 111584011 | 8/2020 |
| CN | 110688238 | 5/2021 |
| CN | 114443649 | 5/2022 |
| JP | 08-137754 | 5/1996 |
| WO | WO 2022/233391 | 11/2022 |

* cited by examiner

501

| Current | Next | Weight |
|---|---|---|
| 0 | 1 | 2 |
| 1 | 2 | 2 |
| 2 | 3 | 2 |
| 3 | 4 | 2 |
| 4 | 5 | 2 |
| 5 | 6 | 2 |
| 6 | 7 | 2 |
| 7 | 0 | 2 |

502

| Current | Next | Weight |
|---|---|---|
| 0 | 1 | 3 |
| 1 | 2 | 2 |
| 2 | 3 | 2 |
| 3 | 4 | 2 |
| 4 | 5 | 2 |
| 5 | 6 | 2 |
| 6 | 7 | 2 |
| 7 | 0 | 2 |

503

| Current | Next | Weight |
|---|---|---|
| 0 | 1 | 3 |
| 1 | 2 | 1 |
| 2 | 3 | 2 |
| 3 | 4 | 2 |
| 4 | 5 | 2 |
| 5 | 6 | 2 |
| 6 | 7 | 2 |
| 7 | 0 | 2 |

504

| Current | Next | Weight |
|---|---|---|
| 0 | 1 | 3 |
| 1 | 2 | 1 |
| 2 | 3 | 2 |
| 3 | 4 | 1 |
| 4 | 5 | 2 |
| 5 | 6 | 2 |
| 6 | 7 | 2 |
| 7 | 0 | 2 |

505

| Current | Next | Weight |
|---|---|---|
| 0 | 1 | 3 |
| 1 | 2 | 1 |
| 2 | 3 | 2 |
| 3 | 4 | 1 |
| 4 | 5 | 2 |
| 5 | 6 | 3 |
| 6 | 7 | 2 |
| 7 | 0 | 2 |

506

| Current | Next | Weight |
|---|---|---|
| 0 | 1 | 3 |
| 1 | 2 | 1 |
| 2 | 3 | 2 |
| 3 | 4 | 1 |
| 4 | 5 | 2 |
| 5 | 6 | 3 |
| 6 | 7 | 3 |
| 7 | 0 | 2 |

507

| Current | Next | Weight |
|---|---|---|
| 0 | 1 | 3 |
| 1 | 2 | 1 |
| 2 | 3 | 2 |
| 3 | 4 | 1 |
| 4 | 5 | 2 |
| 5 | 6 | 3 |
| 6 | 7 | 3 |
| 7 | 0 | 3 |

508

| Current | Next | Weight |
|---|---|---|
| 0 | 1 | 4 |
| 1 | 2 | 1 |
| 2 | 3 | 2 |
| 3 | 4 | 1 |
| 4 | 5 | 2 |
| 5 | 6 | 3 |
| 6 | 7 | 3 |
| 7 | 0 | 3 |

FIG. 5A

SYSTEM AND METHOD FOR EARLY PREFETCH FOR MEMORY DEVICE

PRIORITY

This application is based on and claims priority under 35 U.S.C. § 119(e) to U.S. Provisional Patent Application Serial Nos. 63/579,556, 63/579,563, and 63/579,568, which were filed in the U.S. Patent and Trademark Office on Aug. 30, 2023, the entire content of each of which is incorporated herein by reference.

TECHNICAL AREA

The disclosure relates generally to memory systems and, more particularly, to a method and system for early prefetch operations in such systems to improve throughput performance and efficient resource allocation.

BACKGROUND

Flash based solid-state drives (SSDs) may be utilized as a higher-performance alternative to hard disk drives (HDDs), e.g., in cloud and mobile environments. Although SSDs deliver significantly higher speeds than HDDs, SSDs still remain a performance bottleneck of systems, as processors and dynamic random access memory (DRAM) technologies support three orders of magnitude lower access latency.

SUMMARY

According to an embodiment of the disclosure, a method is provided for performing early prefetch in a memory system. The method includes receiving a data request including an address of a data page stored in a memory device; storing the data request at a first position in a request queue; accessing the data request stored at the first position and performing a first lookup operation for the data request; updating the device request queue, which includes moving the data request stored at the first position to a second position in the request queue; and accessing the data request stored at the second position and performing a second lookup operation for the data request.

According to another embodiment of the disclosure, a memory system is provided, which includes a memory device; a request queue; and a processor configured to receive a data request including an address of a data page stored in the memory device, store the data request at a first position in the request queue, access the data request stored at the first position and perform a first lookup operation for the data request, update the device request queue, which includes moving the data request stored at the first position to a second position in the request queue, and access the data request stored at the second position and perform a second lookup operation for the data request.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIGS. 5A and 5B illustrates an example of adaptive prefetch table update operations, according to an embodiment;

DETAILED DESCRIPTION

Figure 1:
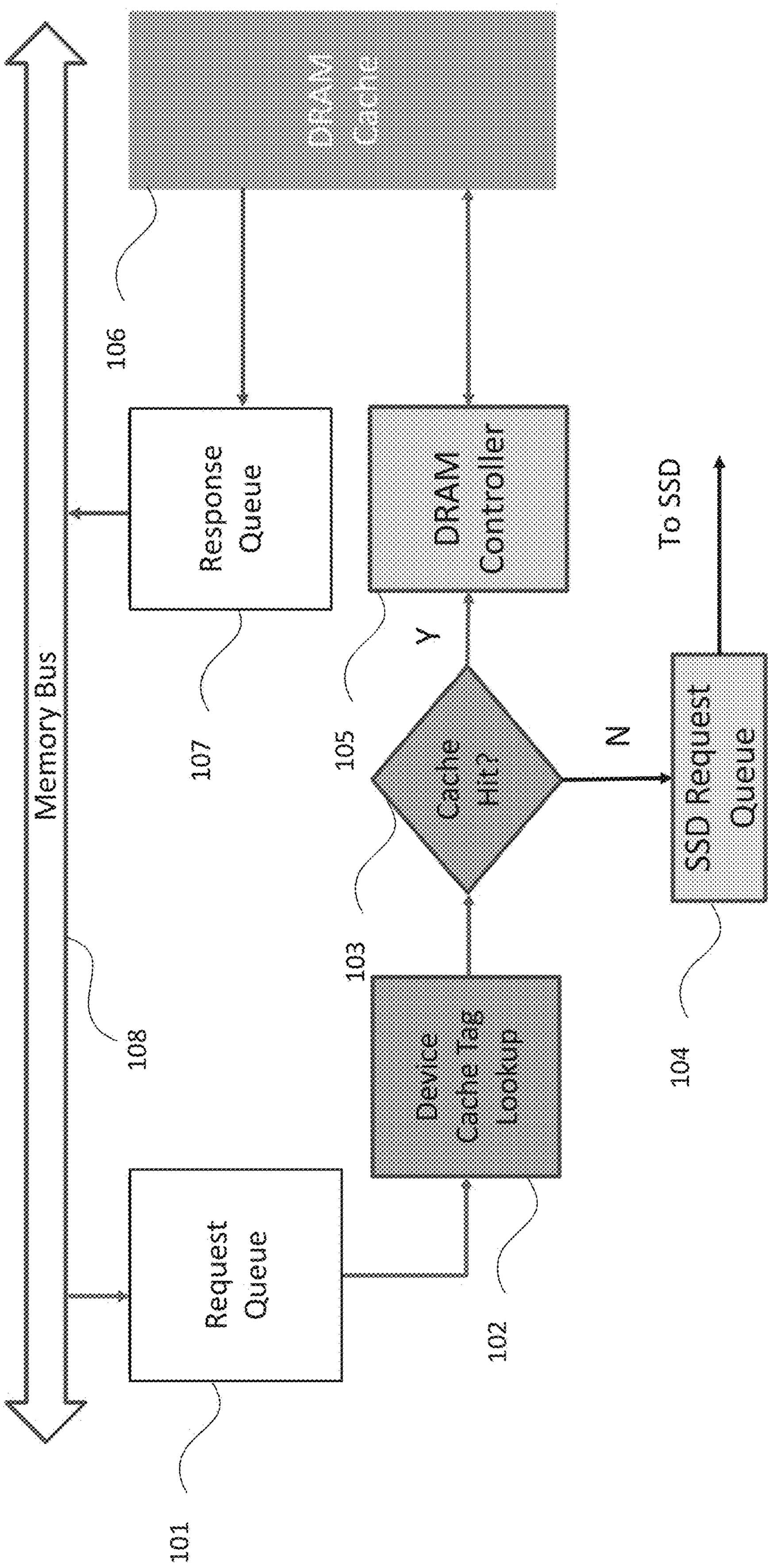
FIG. 1 illustrates caching, without prefetching, in an SSD memory system.

Hereinafter, various embodiments of the present disclosure are described in detail with reference to the accompanying drawings. It should be noted that the same elements will be designated by the same reference numerals although they are shown in different drawings.

In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure.

In addition, descriptions of well-known functions and constructions are omitted for clarity and conciseness.

The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc., may be used for describing various elements, the structural elements are not restricted by the terms. The terms are used to distinguish one element from another element. That is, terms such as "$1^{st}$", "$2^{nd}$," "first," and "second" may be used to distinguish a corresponding component from another component, but are not intended to limit the components in other aspects (e.g., importance or order). For example, without departing from the scope of the present disclosure, a first structural element may be referred to as a second structural element. Similarly, the second structural element may also be referred to as the first structural element.

As used herein, the term "and/or" includes any and all combinations of one or more associated items. Further, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases.

The terms used herein are merely used to describe various embodiments of the present disclosure but are not intended to limit the present disclosure. Singular forms are intended to include plural forms unless the context clearly indicates otherwise. The terms such as "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

An electronic device according to one embodiment may be one of various types of electronic devices utilizing storage devices. The electronic devices may include, e.g., a portable communication device (e.g., a smart phone), a computer, a portable multimedia device, a portable medical device, a camera, a wearable device, or a home appliance. The electronic devices may use any suitable storage standard, such as, e.g., peripheral component interconnect express (PCIe), nonvolatile memory express (NVMe), NVMe-over-fabric (NVMeoF), advanced extensible interface (AXI), ultra path interconnect (UPI), ethernet, transmission control protocol/Internet protocol (TCP/IP), remote direct memory access (RDMA), RDMA over converged ethernet (ROCE), fibre channel (FC), infiniband (IB), serial advanced technology attachment (SATA), small computer systems interface (SCSI), serial attached SCSI (SAS), Internet wide-area RDMA protocol (iWARP), and/or the like, or any combination thereof. In some embodiments, an interconnect interface may be implemented with one or more memory semantic and/or memory coherent interfaces and/or protocols including one or more compute express link (CXL) protocols such as CXL.mem, CXL.io, and/or CXL-.cache, Gen-Z, coherent accelerator processor interface (CAPI), cache coherent interconnect for accelerators (CCIX), and/or the like, or any combination thereof. Any of the memory devices may be implemented with one or more of any type of memory device interface including double data rate (DDR), DDR2, DDR3, DDR4, DDR5, low-power DDR (LPDDRX), open memory interface (OMI), NVlink high bandwidth memory (HBM), HBM2, HBM3, and/or the like. However, an electronic device is not limited to the examples described above.

If an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, firmware, or combination thereof, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an integrated circuit (IC).

While various embodiments of the disclosure are described below with reference to SSD and DRAM cache by way of example, the disclosure is not limited thereto. Accordingly, the various embodiments of the disclosure may also be applied to different types of memory systems and devices.

Two approaches to hide the high access latency of SSD devices are caching and prefetching. Caching utilizes less dense but faster types of memory to store frequently used data items, filtering out many accesses of the slow SSDs. Prefetching is an approach for improving access latency, which predicts future block accesses and preloads them into a memory ahead of time. Prefetching approaches read data from SSDs in advance, in order to serve the later demand accesses from a cache with low latency. Prefetching may be implemented either in software, e.g., within an operating system (OS), or in hardware, e.g., within an SSD itself.

Prefetching mechanisms may be limited by computational complexity and difficulty of correctly predicting future input/output (I/O) accesses. For example, a read-ahead prefetcher is generally limited to prefetching a next data item within a file to accelerate sequential accesses. While more advanced prefetchers have been proposed that can learn complex I/O access patterns proposed, these proposals have generally been dismissed because of their computational cost.

Additionally, most software and hardware prefetching methods are either based on static profiling, or based on hints from applications. Consequently, these methods often do not adapt well to new workloads on multi-processing environments, such as data centers.

Further, cache prefetch requests are usually predicted and created at a central processing unit (CPU) cache controller. However, a CXL-based device cache for a high-capacity, slower SSD flash memory with its unique behaviors should have a separate prefetch policy that can adapted well to an SSD traffic pattern.

FIG. 1 illustrates caching, without prefetching, in an SSD memory system.

Referring to FIG. 1, a DRAM cache 106 is provided to store frequently used data items. As described above, the use of the DRAM cache 106 may filter out many accesses of the slower SSD.

More specifically, upon receipt of a request for data from a request queue 101, a device cache tag lookup 102 will be used to determine if there is a cache hit for the requested data in the DRAM cache 106. That is, the device cache tag lookup 102 is used to determine if the requested data is stored in the DRAM cache 106.

When there is no cache hit at 103, i.e., a cache miss is determined, an SSD request queue 104 receives the data request, which will be sent to the SSD for retrieval. However, when there is cache hit at 103, a DRAM controller 105 receives the data request and controls the requested data to be retrieved from the DRAM cache 106 and to be provided to a response queue 107, in order to be provided to a memory bus 108, in response to the data request.

While the caching process may filter out some access requests to the slower SSD memory, it is only applicable to the frequently used data and is not adaptive.

As described above, prefetching may be used in storage systems to preloading data from a slow storage device (e.g., an SSD) into faster memory, generally DRAM, to decrease overall read latency. Accurate and timely prefetching can effectively reduce the performance gap between different levels of memory.

For example, three metrics may be used to compare prefetchers including coverage, accuracy, and timeliness of prefetchers. Coverage is a ratio of the number of SSD reads that can be prefetched to the total number of SSD reads. Accuracy is a ratio of number of data blocks being prefetched to a number of prefetched data blocks actually requested. Timeliness requires data blocks to be prefetched sufficiently ahead of time so that the data is available in the DRAM whenever the read request is performed. For example, if the prefetched data blocks are not available when they are needed, the read process will stall, rendering prefetching ineffective. If the data is prefetched too early, it may not be available anymore when it is actually needed, due to the eviction from a capacity-limited cache.

Inaccurate prefetches that read in unneeded data may also be harmful as they waste I/O bandwidth and DRAM capacity. If prefetching is performed too conservatively, coverage is low and the overall performance gains are limited. Hence, an ideal prefetcher has high coverage, high accuracy, and executes prefetching timely so that the data is fetched exactly when it is needed.

Figure 2:
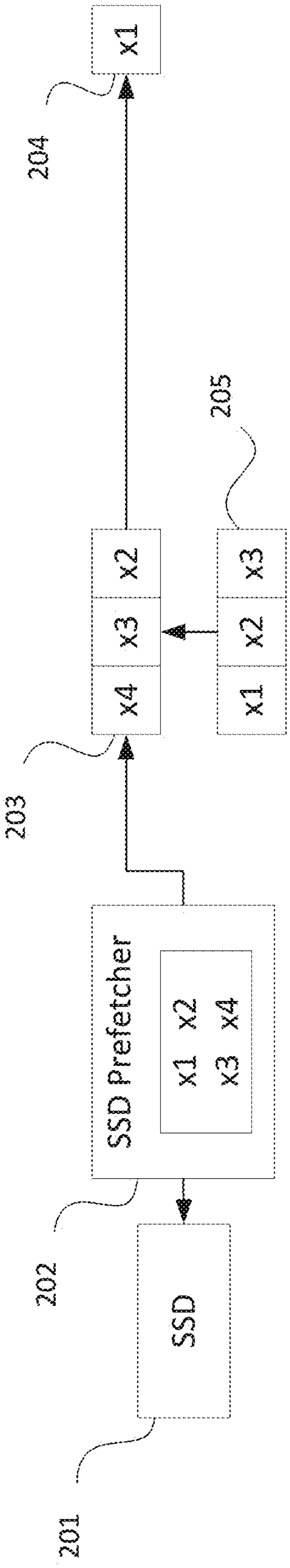
FIG. 2 illustrates a prefetching operation.

FIG. 2 illustrates a prefetching operation.

Referring to FIG. 2, an SSD prefetcher 202 may predict candidate data blocks to prefetch from the SSD 201 into a fast cache (e.g., DRAM) buffer 203 of size 3 data blocks. A cache eviction policy will evict the data blocks from the cache buffer 203 in order to make space for new incoming data. In the example of FIG. 2, at time t, the prefetcher 202 determines candidates x1, x2, x3, and x4 for prefetching, but the actual data requested at time t is x1, x2, and x3 at 205. Accordingly, candidates x2 and x3 are present in the cache buffer 203 when requested, resulting in cache hits. However, x1 was prefetched too early and, at 204, evicted from the cache buffer 203 upon the prefetch of x4, and x4 was inaccurately prefetched, resulting in a cache miss in both the cases.

Figure 3:
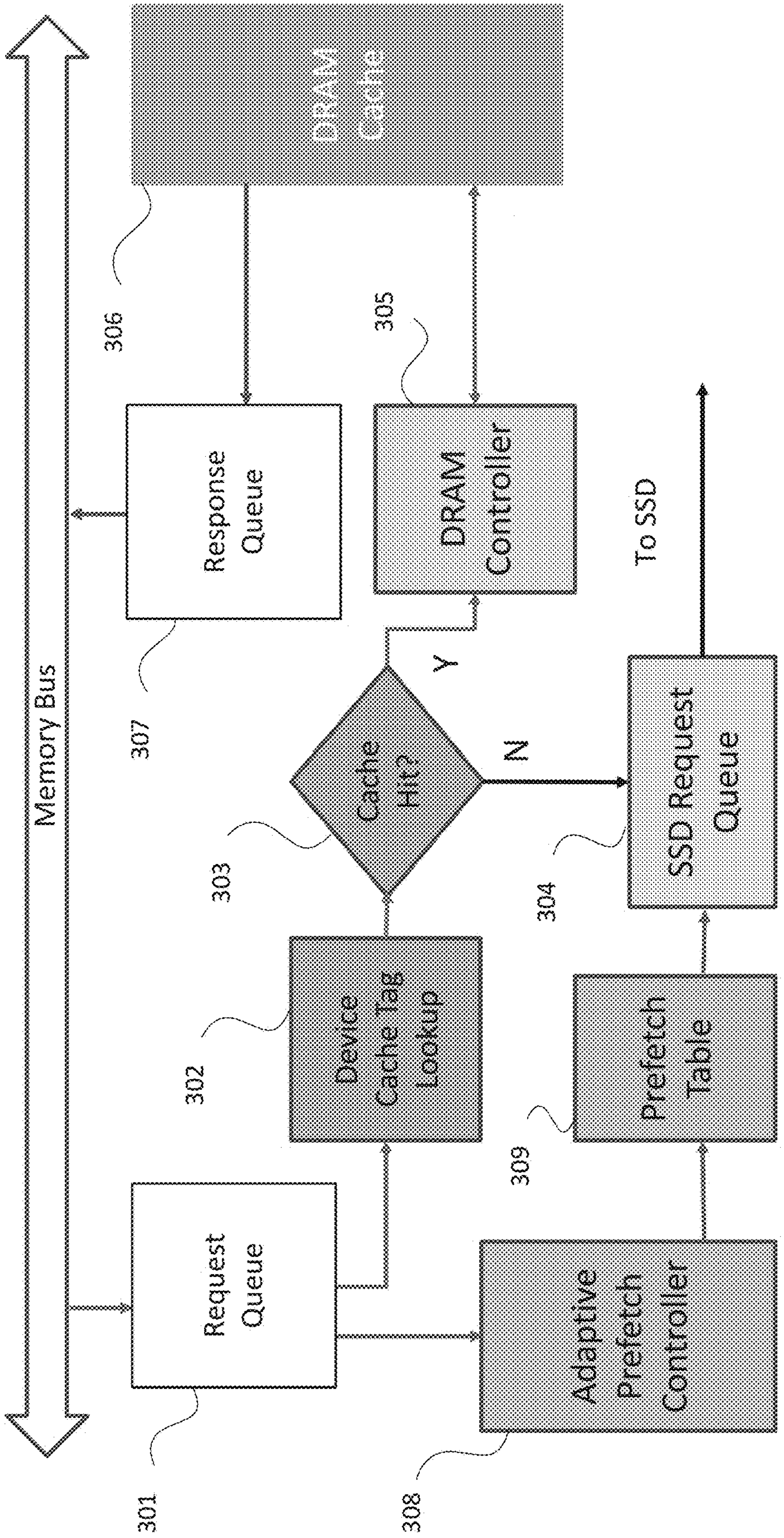
FIG. 3 illustrates an SSD memory system including an adaptive prefetch table, according to an embodiment.

FIG. 3 illustrates an SSD memory system including an adaptive prefetch table, according to an embodiment.

Referring to FIG. 3, similar to the operations in FIG. 1, upon receipt of a request for data from a request queue 301, a device cache tag lookup 302 will be used determine if there is a cache hit for the requested data in a DRAM cache 306. That is, the device cache tag lookup 302 is used to determine if the requested data is stored in the DRAM cache 306.

When there is cache hit at 303, a DRAM controller 305 receives the data request and controls the requested data to be retrieved from the DRAM cache 306 and to be provided to a response queue 307, in order to be provided to a memory bus, in response to the data request. Additionally, when there is no cache hit at 303, an SSD request queue 304 receives the data request, which will be sent to the SSD for retrieval.

Additionally, the data request is provided from the request queue 301 to an adaptive prefetch controller 308, e.g., in a parallel operation.

Upon receipt of the data request, the adaptive prefetch controller 308 performs a lookup operation using an adaptive prefetch table 309, in order to determine if a prefetch operation should be performed based on the received data request. For each data request, the adaptive prefetch table 309 may include a corresponding page entry, i.e., a page address corresponding to the data request, with an associated next page entry, i.e., an address of a predicted next page, and a weight factor of the predicted next page. The weight factor indicates the likelihood of an address of a predicted next page being correct. For example, the adaptive prefetch table 309 may include a 3-port RAM, where each row is indexed by the page address corresponding to the data request, and each row includes the corresponding address of a predicted next page and a weight factor of the predicted next page.

When it is determined that a prefetch operation is to be performed, a prefetch data request is retrieved from the adaptive prefetch table 309 and sent to the SSD request queue 304, which will send the prefetch data request to the SSD for retrieval. The data retrieved from the SSD in response to the prefetch data request may then be pre-stored in a prefetch data buffer for a subsequent data request.

Additionally, upon receiving the data request from the request queue 301, the adaptive prefetch controller 308 may determine whether to update the adaptive prefetch table 309 based on a comparison of the data request and a previous data request. That is, the page address of the current data request and the predicted address of the last request may be used to update the weight factor and/or the address of the predicted next page. This operation will be described below in more detail with reference to FIG. 4.

Figure 4:
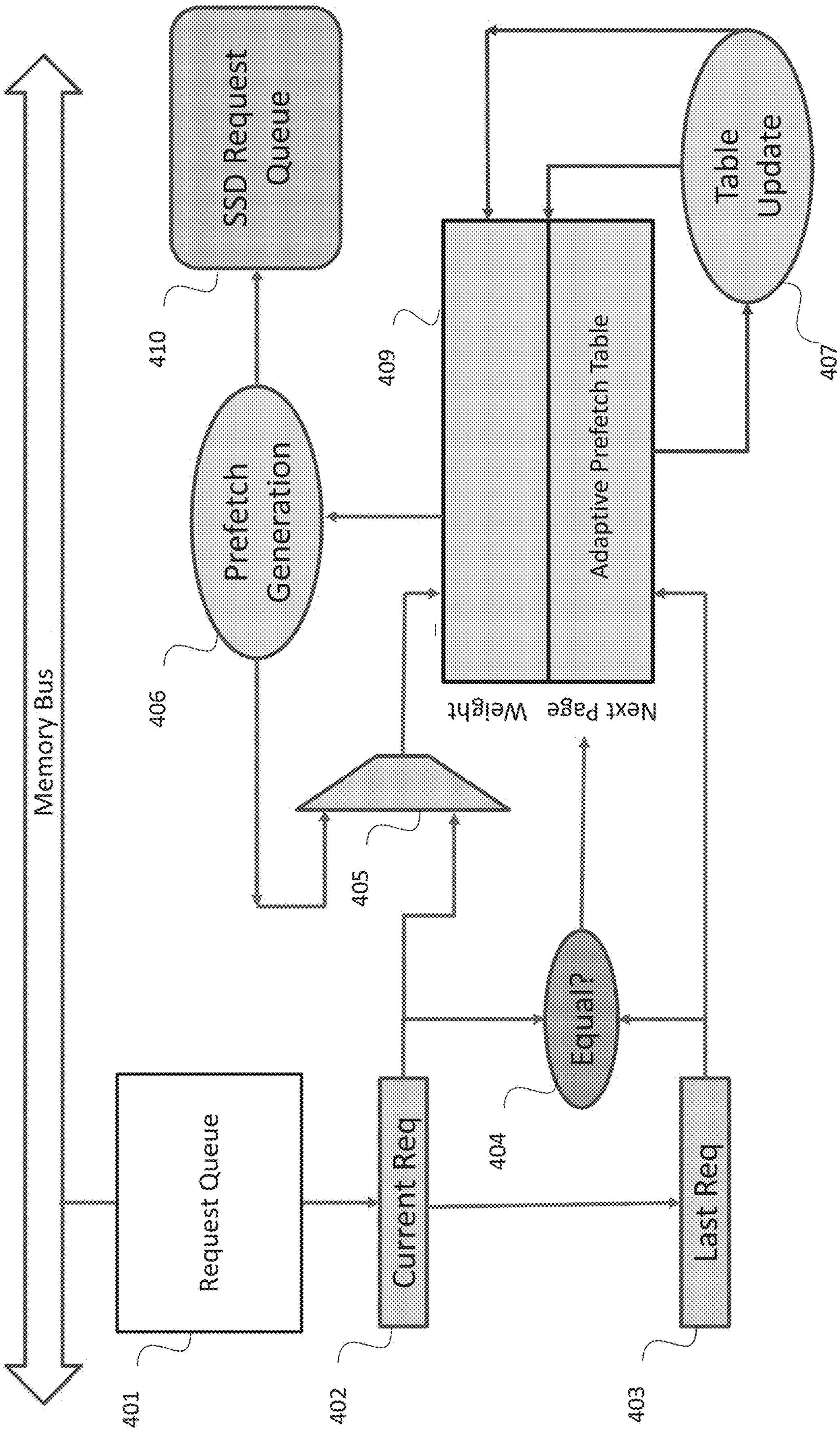
FIG. 4 illustrates an SSD memory system including an adaptive prefetch table, according to an embodiment.

FIG. 4 illustrates operations of an adaptive prefetch controller and an adaptive prefetch table, according to an embodiment.

Referring to FIG. 4, upon receipt of a data request from a request queue 401, an adaptive prefetch controller performs a lookup operation using an adaptive prefetch table 409, in order to determine if a prefetch operation should be performed based on the received data request. More specifically, the adaptive prefetch controller provides a page address of the current data request 402 to the adaptive prefetch table 409, which is used to identify an address of a predicted next page, and a weight factor of the predicted next page. For example, a weight factor range may be 0-5. When the weight factor of the predicted next page is greater than or equal to a predetermined threshold, e.g., 2, a prefetch request generation for the address of the predicted next page is performed at 406, and the prefetch request is sent to an SSD request queue 410 and subsequently sent to the SSD. The predetermined threshold may be controlled/updated by software and set according to system requirements.

Data received from the SSD in response to the prefetch request may be stored in a prefetch cache.

The address of the predicted next page being prefetched is also provided to the adaptive prefetch table 409. The address of the predicted next page being prefetched will subsequently be used as a last next page with a next data request.

As illustrated in FIG. 4, an arbiter 405 may be used to selectively provide the page address of the current data request 402 and the address of the predicted next page being prefetched to the adaptive prefetch table 409.

Additionally, upon receipt of the data request from the request queue 401, the adaptive prefetch controller compares the page address of the current data request 402 to a last predicted next page 403 from a previous data request, in order to determine the accuracy of the predication of the last predicted next page 403 from the previous data request. When the page address of the current data request 402 corresponds to the last predicted next page 403 at 404, the adaptive prefetch controller determines a prefetch cache hit and controls to update, e.g., increase, a weight factor corresponding to the last predicted next page 403 in the adaptive prefetch table 409 at 407. However, when the page address of the current data request 402 does not correspond to the last predicted next page 403 at 404, the adaptive prefetch controller determines a prefetch cache miss and controls to update, e.g., decrease, a weight factor corresponding to the last predicted next page 403 in the adaptive prefetch table 409 at 407.

After a weight factor reaches a predetermined threshold, e.g., hits 0, the adaptive prefetch controller may control to update a predicted next page in the adaptive prefetch table 409 at 407, and may reset a weight factor corresponding to the updated predicted next page to a predetermined value, e.g., 1.

Although the description of FIG. 4 above refers to increasing a weight factor after a hit and decreasing a weight factor after a miss, and prefetch request generation being performed when the weight factor is greater than the predetermined threshold, the disclosure is not limited thereto. For example, a weight factor may be decreased after a hit and increased after a miss, and prefetch request generation being performed when the weight factor is less than the predetermined threshold.

Table 1 below illustrates an example algorithm for updating an adaptive prefetch table.

TABLE 1

```
If (current page.address = last page.next_address)
    weight_factor = weight_factor + 1;
else
  if (weight_factor == 0) {
        weight_factor = 1;
        last page.next_address = current page.address; }
else
      weight_factor = weight_factor − 1;
```

As shown in Table 1 above, if a page address of a current data request (current page.address) is equal to a page address of a last predicted next page (last page.next_address), i.e., the page address of a predicted next page corresponding to a previous data request, then a weight factor associated with a page address of the previous data request is increased by 1.

If the page address of the current data request is not equal to the page address of the last predicted next page, and if the weight factor associated with the page address of the previous data request is equal to 0, then the weight factor associated with the page address of the previous data request is set to 1 and the page address of the last predicted next page is set to the page address of the current data request.

If the page address of the current data request is not equal to the page address of the last predicted next page, and the weight factor associated with the page address of the previous data request is not equal to 0, then the weight factor associated with the page address of the previous data request is decreased by 1.

Using an algorithm as illustrated in Table 1, a hardware, adaptive prefetch table may dynamically adapt itself to new workloads and new applications making it a good ML tool.

Figure 5B:
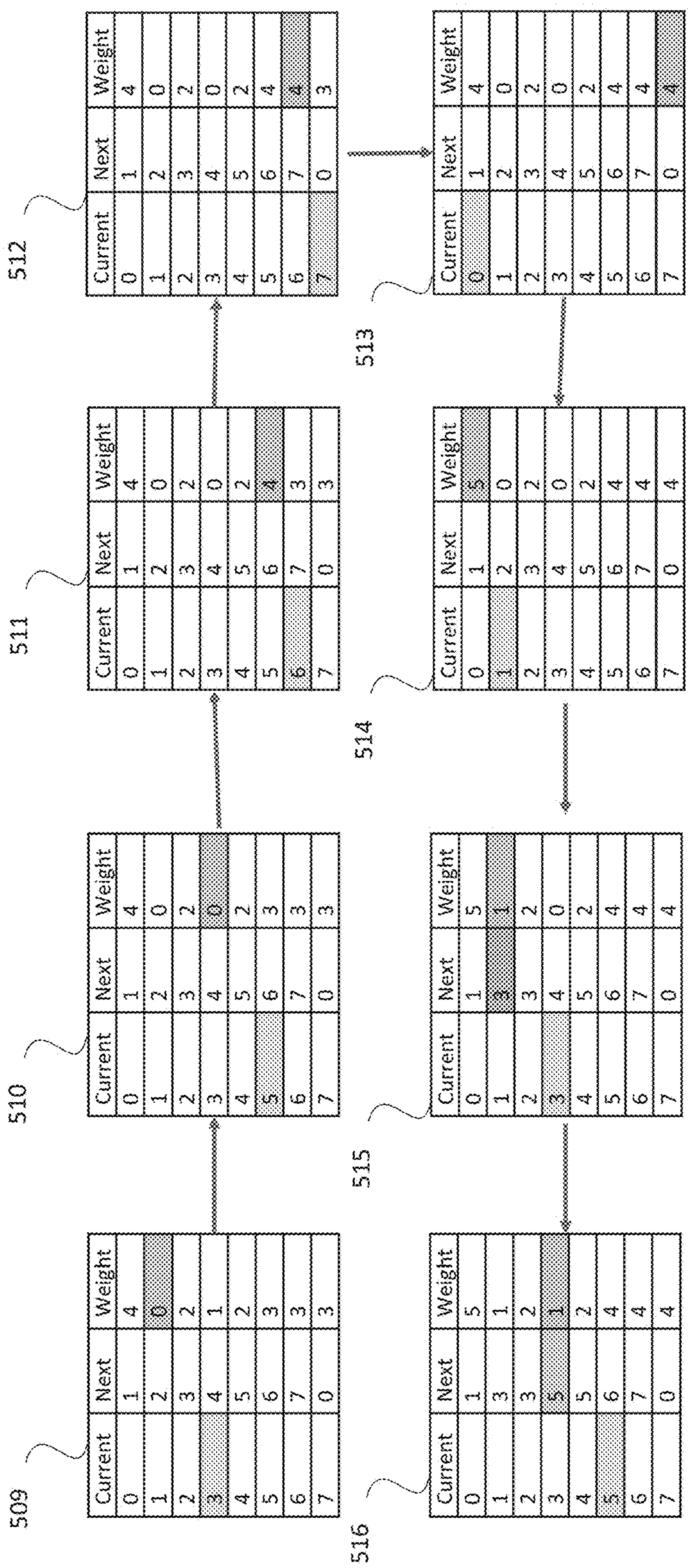

FIGS. 5A and 5B illustrates an example of adaptive prefetch table update operations, according to an embodiment.

Referring to FIG. 5A, the adaptive prefetch, at 501, initially uses a sequential access order, such that a predicted next page is initially in a sequential next page. However, the disclosure is not limited thereto. For example, the initial table could be set to different values based on traces collected from a diverse set of data center applications.

Additionally, the weight factor range is 0-5, where a prefetch threshold is 2, and it is assumed that an access pattern (0, 1, 3, 5, 6, 7) is repeated.

Accordingly, upon receiving a data request for page 0, i.e., the first the page address in the access pattern, an adaptive prefetch controller provides 0 to the adaptive prefetch table, at 501, which indicates that an address of a predicted next page is 1 and a weight factor of the predicted next page is 2.

Upon receiving a data request for page 1, i.e., the second page address in the access pattern, the adaptive prefetch controller provides 1 to the adaptive prefetch table, at 502, which indicates that an address of a predicted next page is 2 and a weight factor of the predicted next page is 2.

Further, when a weight factor of a predicted next page satisfies a prefetch threshold, a prefetch request is generated for the address of the predicted next page.

For example, because the weight factor of the predicted next page is 2, which is greater than or equal to the prefetch threshold of 2, i.e., satisfies the prefetch threshold, a prefetch request is generated for the address of the predicted next page, i.e., 2.

At this time, the page address of the current request, i.e., 1, is compared to the address of the predicted next page of the previous request, i.e., 1. Because the page address of the current request corresponds to the address of the predicted next page of the previous request, i.e., both are 1, the weight factor of the predicted next page of the previous request is updated from 2 to 3 at 502.

Upon receiving a data request for page 3, i.e., the third page address in the access pattern, the adaptive prefetch controller provides 3 to the adaptive prefetch table, at 503, which indicates that an address of a predicted next page is 4 and a weight factor of the predicted next page is 2. Further, because the weight factor of the predicted next page is 2, which is greater than or equal to the prefetch threshold of 2, a prefetch request is generated for the address of the predicted next page, i.e., 4.

At this time, the page address of the current request, i.e., 3, is compared to the address of the predicted next page of the previous request, i.e., 2. Because the page address of the current request does not correspond to the address of the predicted next page of the previous request, the weight factor of the predicted next page of the previous request is updated from 2 to 1 at 503.

Upon receiving a data request for page 5, i.e., the fourth page address in the access pattern, the adaptive prefetch controller provides 5 to the adaptive prefetch table, at 504, which indicates that an address of a predicted next page is 6 and a weight factor of the predicted next page is 2. Further, because the weight factor of the predicted next page is 2, which is greater than or equal to the prefetch threshold of 2, a prefetch request is generated for the address of the predicted next page, i.e., 6.

At this time, the page address of the current request, i.e., 5, is compared to the address of the predicted next page of the previous request, i.e., 4. Because the page address of the current request does not correspond to the address of the predicted next page of the previous request, the weight factor of the predicted next page of the previous request is updated from 2 to 1 at 504.

Upon receiving a data request for page 6, i.e., the fifth page address in the access pattern, the adaptive prefetch controller provides 6 to the adaptive prefetch table, at 505, which indicates that an address of a predicted next page is 7 and a weight factor of the predicted next page is 2. Further, because the weight factor of the predicted next page is 2, which is greater than or equal to the prefetch threshold of 2, a prefetch request is generated for the address of the predicted next page, i.e., 7.

At this time, the page address of the current request, i.e., 6, is compared to the address of the predicted next page of the previous request, i.e., 6. Because the page address of the current request corresponds to the address of the predicted next page of the previous request, i.e., both are 6, the weight factor of the predicted next page of the previous request is updated from 2 to 3 at 505.

Upon receiving a data request for page 7, i.e., the sixth page address in the access pattern, the adaptive prefetch controller provides 7 to the adaptive prefetch table, at 506, which indicates that an address of a predicted next page is 0 and a weight factor of the predicted next page is 2. Further, because the weight factor of the predicted next page is 2, which is greater than or equal to the prefetch threshold of 2, a prefetch request is generated for the address of the predicted next page, i.e., 0.

At this time, the page address of the current request, i.e., 7, is compared to the address of the predicted next page of the previous request, i.e., 7. Because the page address of the current request corresponds to the address of the predicted next page of the previous request, i.e., both are 7, the weight factor of the predicted next page of the previous request is updated from 2 to 3 at 506.

Upon receiving a data request for page 0, i.e., the first page address in the access pattern, the adaptive prefetch controller provides 0 to the adaptive prefetch table, at 507, which indicates that an address of a predicted next page is 1 and a weight factor of the predicted next page is 3. Further, because the weight factor of the predicted next page is 3, which is greater than or equal to the prefetch threshold of 2, a prefetch request is generated for the address of the predicted next page, i.e., 1.

At this time, the page address of the current request, i.e., 0, is compared to the address of the predicted next page of the previous request, i.e., 0. Because the page address of the current request corresponds to the address of the predicted next page of the previous request, i.e., both are 0, the weight factor of the predicted next page of the previous request is updated from 2 to 3 at 507.

Upon receiving a data request for page 1, i.e., the second page address in the access pattern, the adaptive prefetch controller provides 1 to the adaptive prefetch table, at 508, which indicates that an address of a predicted next page is 2 and a weight factor of the predicted next page is 1. Further, because the weight factor of the predicted next page is 1, which is not greater than or equal to the prefetch threshold of 2, a prefetch request is not generated for the address of the predicted next page.

At this time, the page address of the current request, i.e., 1, is compared to the address of the predicted next page of the previous request, i.e., 1. Because the page address of the current request corresponds to the address of the predicted next page of the previous request, i.e., both are 1, the weight factor of the predicted next page of the previous request is updated from 3 to 4 at 508.

Referring to FIG. 5B, upon receiving a data request for page 3, i.e., the third page address in the access pattern, the adaptive prefetch controller provides 3 to the adaptive prefetch table, at 509, which indicates that an address of a predicted next page is 4 and a weight factor of the predicted next page is 1. Further, because the weight factor of the predicted next page is 1, which is not greater than or equal to the prefetch threshold of 2, a prefetch request not is generated for the address of the predicted next page.

At this time, the page address of the current request, i.e., 3, is compared to the address of the predicted next page of the previous request, i.e., 2. Because the page address of the current request does not correspond to the address of the predicted next page of the previous request, the weight factor of the predicted next page of the previous request is updated from 1 to 0 at 509.

Upon receiving a data request for page 5, i.e., the fourth page address in the access pattern, the adaptive prefetch controller provides 5 to the adaptive prefetch table, at 510, which indicates that an address of a predicted next page is 6 and a weight factor of the predicted next page is 3. Further, because the weight factor of the predicted next page is 3, which is greater than or equal to the prefetch threshold of 2, a prefetch request is generated for the address of the predicted next page, i.e., 6.

At this time, the page address of the current request, i.e., 5, is compared to the address of the predicted next page of the previous request, i.e., 4. Because the page address of the current request does not correspond to the address of the predicted next page of the previous request, the weight factor of the predicted next page of the previous request is updated from 1 to 0 at 510.

Upon receiving a data request for page 6, i.e., the fifth page address in the access pattern, the adaptive prefetch controller provides 6 to the adaptive prefetch table, at 511, which indicates that an address of a predicted next page is 7 and a weight factor of the predicted next page is 3. Further, because the weight factor of the predicted next page is 3, which is greater than or equal to the prefetch threshold of 2, a prefetch request is generated for the address of the predicted next page, i.e., 7.

At this time, the page address of the current request, i.e., 6, is compared to the address of the predicted next page of the previous request, i.e., 6. Because the page address of the current request corresponds to the address of the predicted next page of the previous request, i.e., both are 6, the weight factor of the predicted next page of the previous request is updated from 3 to 4 at 511.

Upon receiving a data request for page 7, i.e., the sixth page address in the access pattern, the adaptive prefetch controller provides 7 to the adaptive prefetch table, at 512, which indicates that an address of a predicted next page is 0 and a weight factor of the predicted next page is 3. Further, because the weight factor of the predicted next page is 3, which is greater than or equal to the prefetch threshold of 2, a prefetch request is generated for the address of the predicted next page, i.e., 0.

At this time, the page address of the current request, i.e., 7, is compared to the address of the predicted next page of the previous request, i.e., 7. Because the page address of the current request corresponds to the address of the predicted next page of the previous request, i.e., both are 7, the weight factor of the predicted next page of the previous request is updated from 3 to 4 at 512.

Upon receiving a data request for page 0, i.e., the first page address in the access pattern, the adaptive prefetch controller provides 0 to the adaptive prefetch table, at 513, which indicates that an address of a predicted next page is 1 and a weight factor of the predicted next page is 4. Further, because the weight factor of the predicted next page is 4, which is greater than or equal to the prefetch threshold of 2, a prefetch request is generated for the address of the predicted next page, i.e., 1.

At this time, the page address of the current request, i.e., 0, is compared to the address of the predicted next page of the previous request, i.e., 0. Because the page address of the current request corresponds to the address of the predicted next page of the previous request, i.e., both are 0, the weight factor of the predicted next page of the previous request is updated from 3 to 4 at 513.

Upon receiving a data request for page 1, i.e., the second page address in the access pattern, the adaptive prefetch controller provides 1 to the adaptive prefetch table, at 514, which indicates that an address of a predicted next page is 2 and a weight factor of the predicted next page is 0. Further, because the weight factor of the predicted next page is 0, which is not greater than or equal to the prefetch threshold of 2, a prefetch request is not generated for the address of the predicted next page.

At this time, the page address of the current request, i.e., 1, is compared to the address of the predicted next page of the previous request, i.e., 1. Because the page address of the current request corresponds to the address of the predicted next page of the previous request, i.e., both are 1, the weight factor of the predicted next page of the previous request is updated from 4 to 5 at 514.

Upon receiving a data request for page 3, i.e., the third page address in the access pattern, the adaptive prefetch controller provides 3 to the adaptive prefetch table, at 515, which indicates that an address of a predicted next page is 4 and a weight factor of the predicted next page is 0. Further, because the weight factor of the predicted next page is 0, which is not greater than or equal to the prefetch threshold of 2, a prefetch request is not generated for the address of the predicted next page.

At this time, because the weight factor of the predicted next page of the previous request is equal to 0, the weight factor of the predicted next page of the previous request is changed from 0 to 1 and the address of the predicted next page of the previous request is changed to the page address of the current data request, i.e., from 2 to 3, at 515.

Upon receiving a data request for page 5, i.e., the fourth page address in the access pattern, the adaptive prefetch controller provides 5 to the adaptive prefetch table, at 516, which indicates that an address of a predicted next page is 6 and a weight factor of the predicted next page is 4. Further, because the weight factor of the predicted next page is 4, which is greater than or equal to the prefetch threshold of 2, a prefetch request is generated for the address of the predicted next page, i.e., 6.

At this time, because the weight factor of the predicted next page of the previous request is equal to 0, the weight factor of the predicted next page of the previous request is changed from 0 to 1 and the address of the predicted next page of the previous request is changed to the page address of the current data request, i.e., from 4 to 5, at 516.

Although the embodiments above have been describe using examples in which one page may be prefetched in response to a data request for a current page, the disclosure is not limited thereto. For example, multiple pages may be prefetched in response to a data request for a current page.

Table 2 below illustrates an example algorithm for prefetch generation using an adaptive prefetch table.

TABLE 2

```
prefetch_generate = YES;
for (n = 1; n<= prefetch_stride; n=n+1) {
  if (current page.weight_factor < prefetch_threshold) {
    prefetch_generation= NO;
```

TABLE 2-continued

```
    break; }
  current page = current page.next_address;
}
Prefetch_address= current page.next_address;
A prefetch request will be generated if (prefetch_generate == YES)
```

As shown in Table 2 above, a prefetch_stride, e.g., N, may be set by software, which allows the system to possibly prefetch N next address pages ahead of a current address page.

Figure 6:
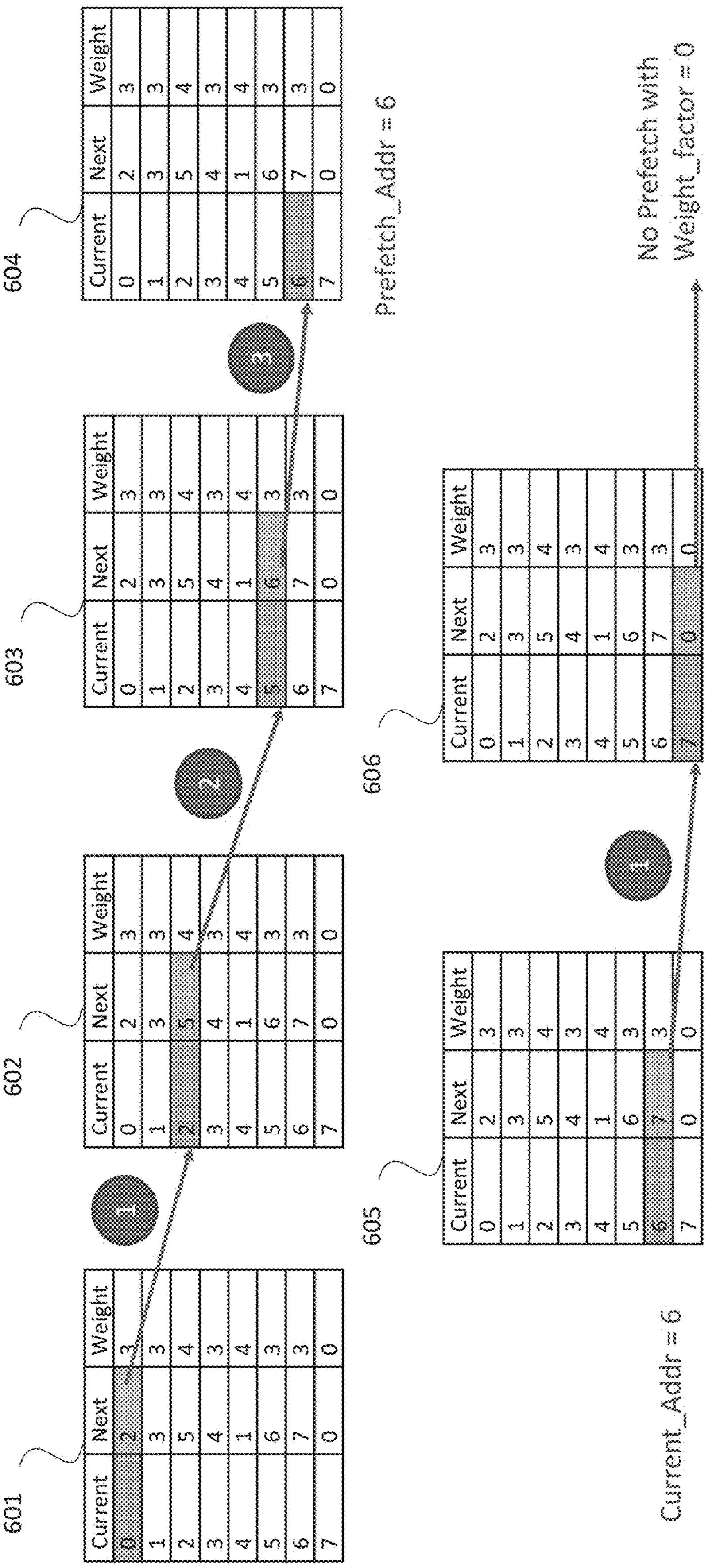
FIG. 6 illustrates examples prefetch operations using an adaptive prefetch table and a prefetch stride greater than 1, according to an embodiment.

FIG. 6 illustrates example prefetch operations using an adaptive prefetch table and a prefetch stride greater than 1, according to an embodiment.

Referring to FIG. 6, the prefetch stride is set to 3 and the prefetch threshold is set to 2.

In a $1^{st}$ example, upon receiving a data request for page 0, the adaptive prefetch controller provides 0 to the adaptive prefetch table, at 601, which indicates that an address of a predicted next page is 2 and a weight factor of the predicted next page is 3. Further, because the weight factor of the predicted next page is 3, which is greater than or equal to the prefetch threshold of 2, a prefetch request is generated for the address of the predicted next page, i.e., 2.

Additionally, because the prefetch stride is set to 3, and only one prefetch operation has been performed, i.e., n=1, the adaptive prefetch table identifies the predicted next page, i.e., 2, as a current page address at 602, which indicates that an address of a predicted next page is 5 and a weight factor of the predicted next page is 4. Further, because the weight factor of the predicted next page is 4, which is greater than or equal to the prefetch threshold of 2, a prefetch request is generated for the address of the predicted next page, i.e., 5.

Additionally, because the prefetch stride is set to 3, and only two prefetch operations have been performed, i.e., n=2, the adaptive prefetch table identifies the predicted next page, i.e., 5, as a current page address at 603, which indicates that an address of a predicted next page is 5 and a weight factor of the predicted next page is 3. Further, because the weight factor of the predicted next page is 3, which is greater than or equal to the prefetch threshold of 2, a prefetch request is generated for the address of the predicted next page, i.e., 6.

Additionally, because the prefetch stride is set to 3, and three prefetch operations have been performed, i.e., n=3, the procedure is ended for the original data request for page 0.

In the $2^{nd}$ example, upon receiving a data request for page 6, the adaptive prefetch controller provides 6 to the adaptive prefetch table, at 605, which indicates that an address of a predicted next page is 7 and a weight factor of the predicted next page is 3. Further, because the weight factor of the predicted next page is 3, which is greater than or equal to the prefetch threshold of 2, a prefetch request is generated for the address of the predicted next page, i.e., 7.

Additionally, because the prefetch stride is set to 3, and only one prefetch operation has been performed, i.e., n=1, the adaptive prefetch table identifies the predicted next page, i.e., 7, as a current page address at 606, which indicates that an address of a predicted next page is 0 and a weight factor of the predicted next page is 0. However, because the weight factor of the predicted next page is 0, which is not greater than or equal to the prefetch threshold of 2, no prefetch request is generated for the address of the predicted next page, and the procedure is ended for the original data request for page 6.

Figure 7:
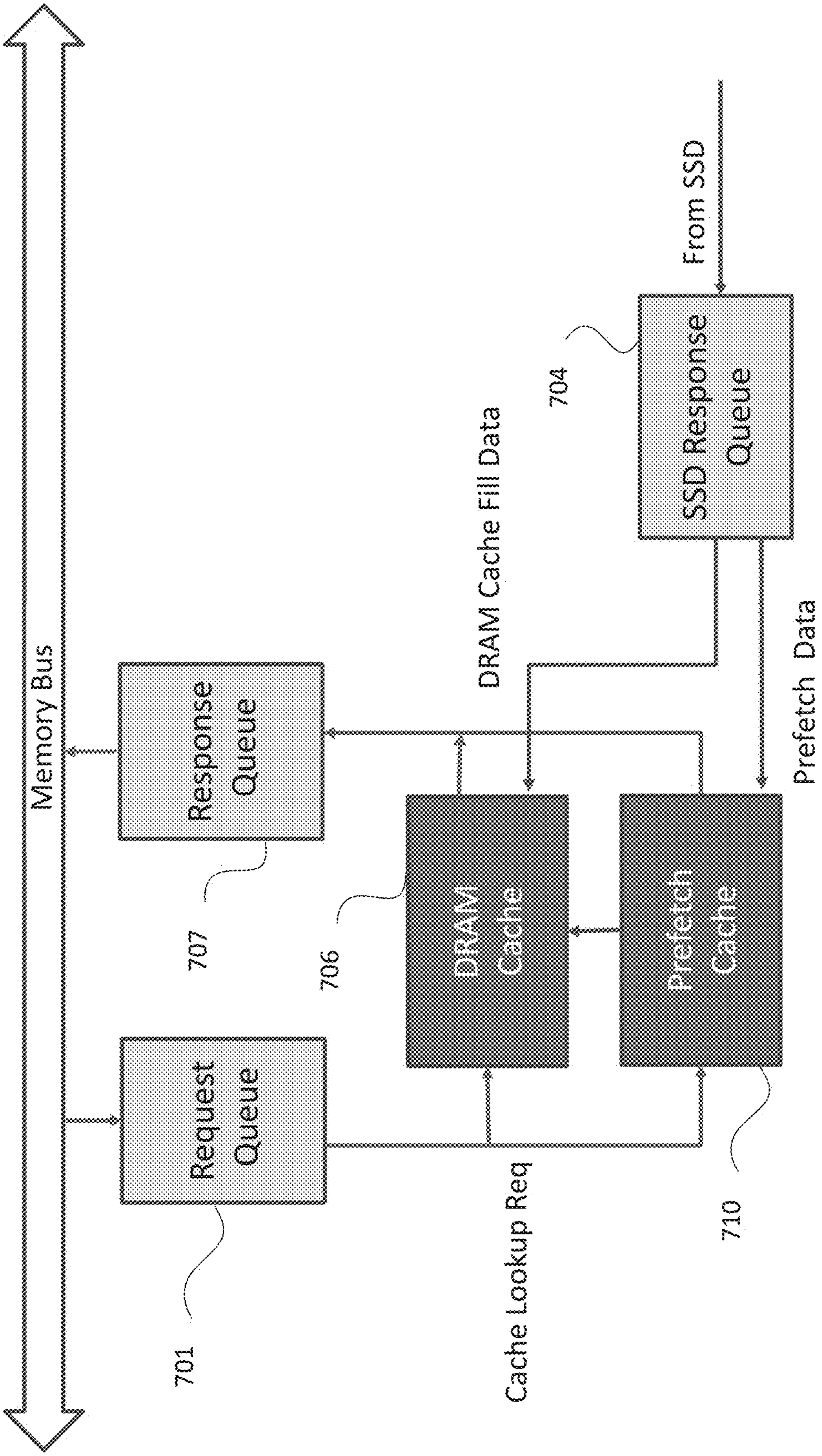
FIG. 7 illustrates an SSD memory system including a prefetch cache, according to an embodiment.

FIG. 7 illustrates an SSD memory system including a prefetch cache, according to an embodiment.

Referring to FIG. 7, the SSD memory system includes a request queue 701, a DRAM cache 706, a response queue 707, a prefetch cache 710, and an SSD response queue 704.

The request queue 701 receives and stores data requests for the SSD, which are sequentially processed.

The DRAM cache 706 stores frequently used data items from the SSD.

The prefetch cache 710 is a fast temporary buffer used to store prefetched data from the prefetch requests to the SSD. With a smaller size, the prefetch cache 710 can be implemented as a very fast on-chip cache, while the DRAM cache 706 is generally implemented off-chip on slower DRAM. The prefetch cache 710 may isolate the DRAM cache 706 operations from speculative request/response data from a prefetch operation.

The prefetch cache 710 can be seen as an extension of the DRAM cache 706. However, the replacement policies of these two cache are completely independent of each other.

The capacity of the prefetch cache 710 should be calculated to have enough space to store outstanding prefetch response pages. For example, the number of outstanding prefetch requests may be closely related to a size of the request queue 701.

The data stored in the DRAM cache 706 and the prefetch cache 710 is provided from the SSD via the SSD response queue 704, e.g., in response to a DRAM cache data fill request or a prefetch data request.

Upon processing a data request from the request queue 701, a cache lookup request may be sent from the request queue 701 to the DRAM cache 706 and the prefetch cache 710. When the requested data is stored in the DRAM cache 706 or the prefetch cache 710, the requested data is retrieved from the respective cache and provided to the response queue 707, and then provided via a bus to a requesting device or software in response to the data request. When the requested data is not stored in the DRAM cache 706, but is stored the prefetch cache 710, the requested data may also be provided from the prefetch cache 710 to the DRAM cache 706. Additionally, after providing the requested data to the DRAM cache 706, a copy of the requested data may be vacated (invalidated) from the prefetch cache 710 to make space for a next prefetched data.

Figure 8:
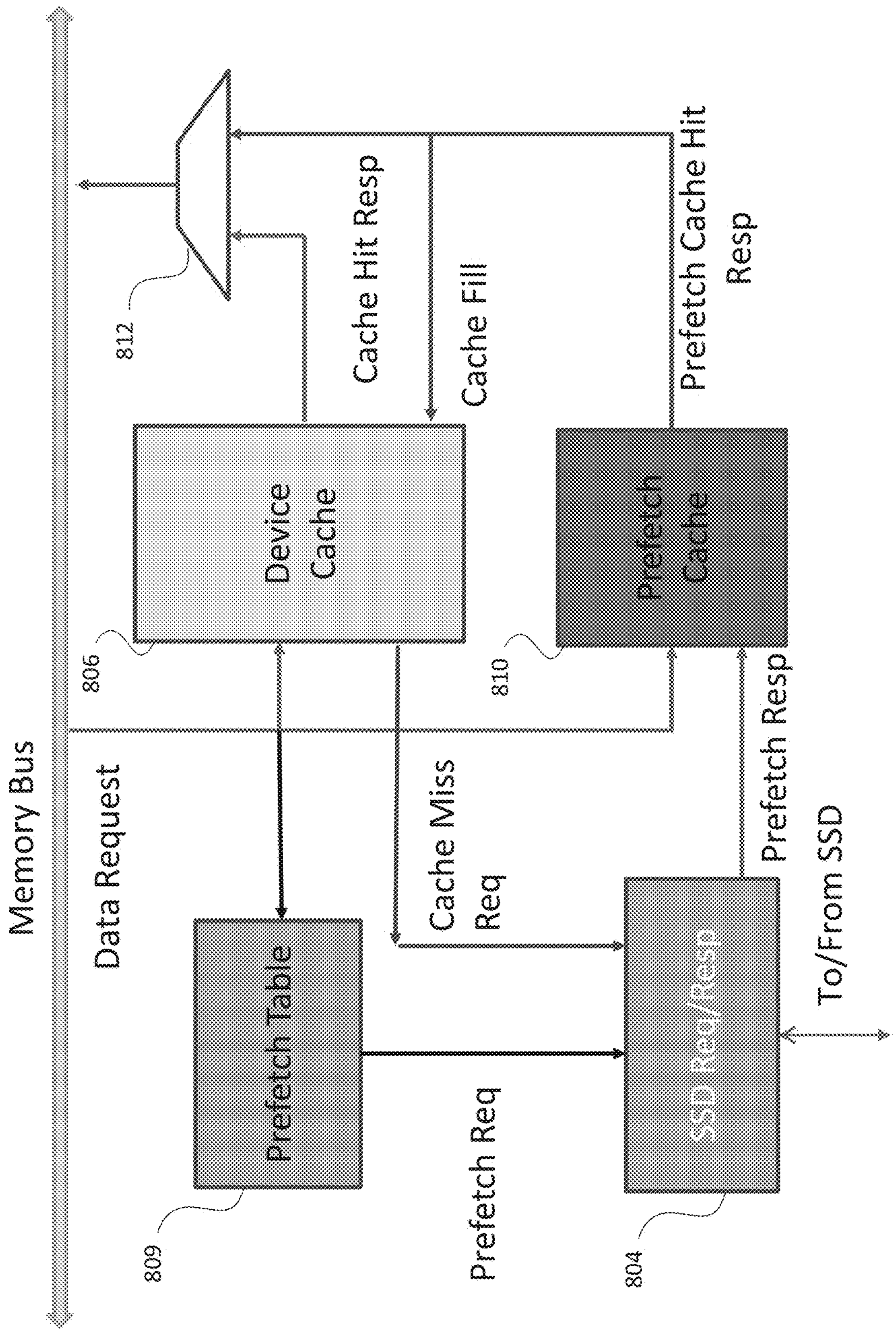
FIG. 8 illustrates operations of an SSD memory system including a prefetch cache, according to an embodiment.

FIG. 8 illustrates operations of an SSD memory system including a prefetch cache according to an embodiment.

Referring to FIG. 8, when a data request is received via a memory bus, e.g., a CXL memory bus, it may be provided to a prefetch table 809, a device cache (or DRAM cache) 806, and a prefetch cache 810.

Upon receiving the data request, the prefetch table 809 is used to determine if a prefetch request should be generated for a predicted next page, e.g., as illustrated in FIG. 4. When a prefetch request is generated, the generated prefetch request is provided to an SSD request/response queue 804 for sequential processing.

After the SSD request/response queue 804 sends the generated prefetch request to the SSD and then receives requested prefetch data, the SSD request/response queue 804 provides the received data to the prefetch cache 810 for storage.

Upon receiving the data request, the device cache 806 determines if the requested data is stored therein. When the requested data is stored in the device cache 806, the device cache 806 provides the requested data in response to the request.

Upon receiving the data request, the prefetch cache 810 determines if the requested data is stored therein. When the requested data is stored in the prefetch cache 810, prefetch cache 810 provides the requested data in response to the request.

As illustrated in FIG. 8, an arbiter 812 may be used to selectively provide the requested data from the device cache 806 and the prefetch cache 810.

Additionally, when the requested data is stored in the prefetch cache 810, and not in the device cache 806, the prefetch cache 810 may also provide the requested data to the device cache 806. Thereafter, the prefetch cache 810 may evict the provided data therefrom, freeing up space for more prefetched data.

If neither the device cache 806 nor the prefetch cache 810 has the requested data, then a cache miss request may be generated and sent to the SSD request/response queue 804 in order to retrieve the requested data from the SSD.

Figure 9:
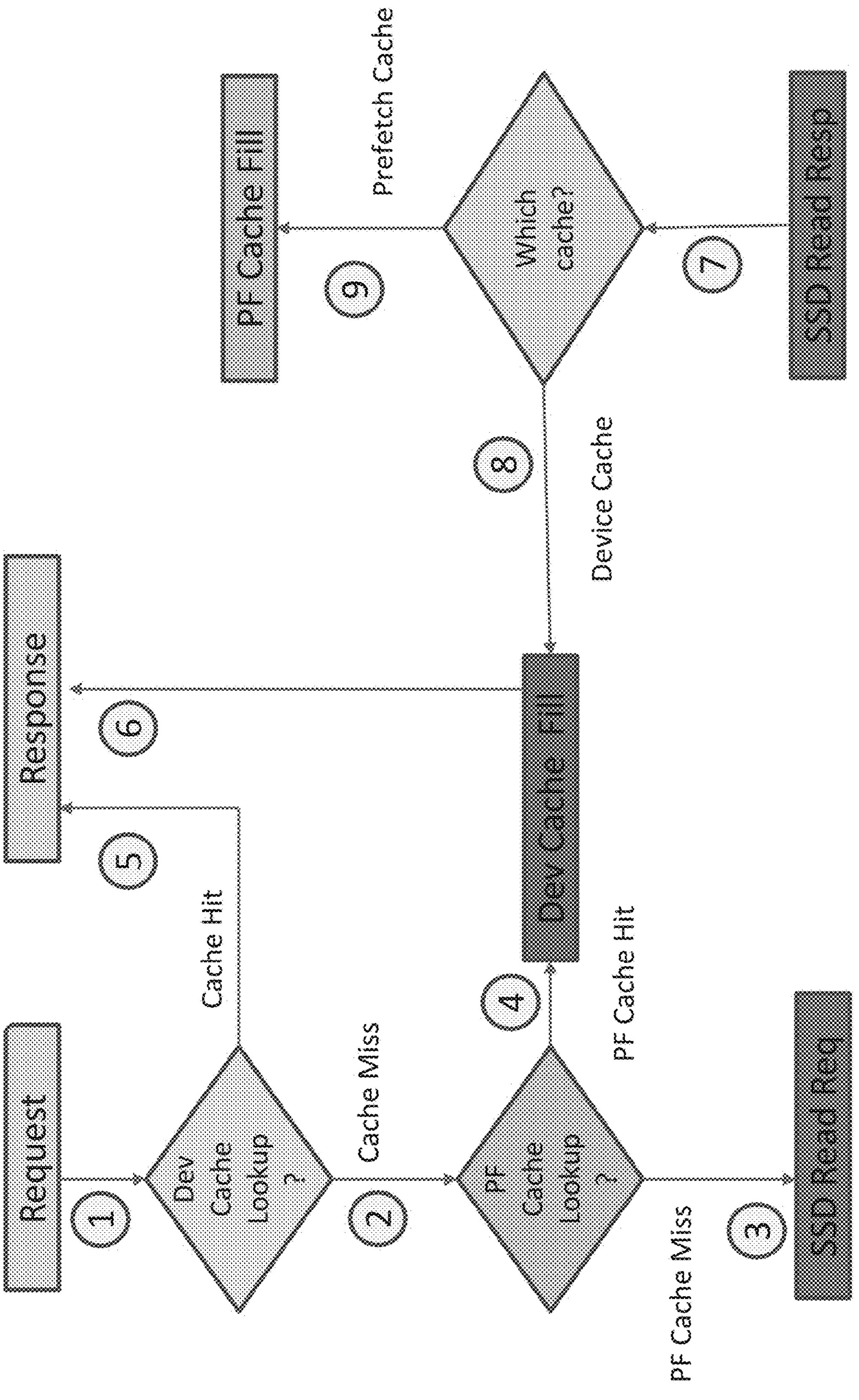
FIG. 9 is a flow diagram illustrating a method for processing a data request in an SSD memory system including a prefetch cache, according to an embodiment.

FIG. 9 is a flow diagram illustrating a method for processing a data request in an SSD memory system including a prefetch cache, according to an embodiment.

Referring to FIG. 9, in step 1, a device cache lookup is performed for a received data request. When a cache hit occurs, i.e., when the requested data is stored in the device cache, the requested data is provided in response to the request in step 5. However, when a cache miss occurs, i.e., when the requested data is not stored in the device cache, a prefetch cache lookup is performed in step 2.

When a prefetch cache hit occurs in step 2, i.e., when the requested data is stored in the prefetch cache, the requested data is stored the device cache in step 4 and is provided in response to the request in step 6. However, when a prefetch cache miss occurs, i.e., when the requested data is not stored in the prefetch cache, the data is requested from the SSD in step 3.

After receiving data from the SSD, a determination is made as to which cache should receive the data in step 7. If the received data is in response to a request for data that was not stored in either of the device cache or the prefetch cache, then the received data is stored the device cache in step 8 and is provided in response to the request in step 6. However, if the received data is in response to a prefetch request, then the received data is stored the prefetch cache in step 9.

As described above, a prefetch cache may operate similar to a device cache and can provide quick responses to a data request if the request hits any pages on the prefetch cache. Further, even though the prefetch may be somewhat speculative, it does not force any eviction of useful data from the device cache.

In accordance with another embodiment of the disclosure, an early prefetch mechanism is provided to ensure that prefetch data is available before it is needed, maintaining good system throughput. More specifically, the system will try to compute (or lookup) and generate a prefetch request very early, when a data request initially enters a request queue.

For example, a data request quick lookup may be performed with a bloom filter structure to identify device cache hit/miss status. The same request will go through an adaptive prefetch table to determine if a prefetch request should be generated and sent to the SSD device.

When the data request is at the head of the request queue, another lookup may be performed at the prefetch cache to see if the response data for the early prefetch request is ready (or still in the pending state). A hit in the prefetch cache would provide response data for the request, and promote the requested page to the main SSD cache.

Figure 10:
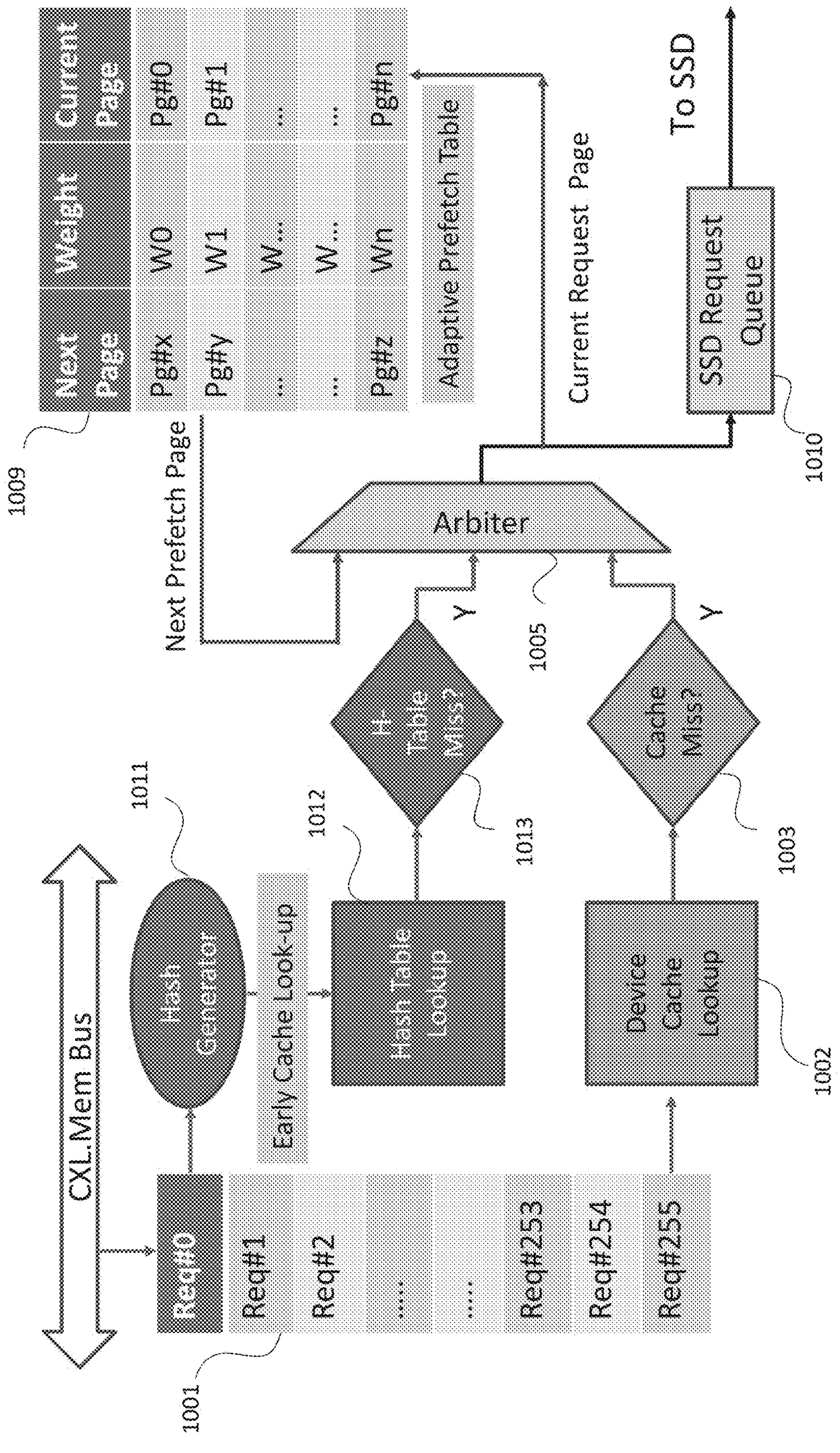
FIG. 10 illustrates an early prefetch operations for an SSD memory system including a deep request queue, according to an embodiment.

FIG. 10 illustrates an early prefetch operation for an SSD memory system including a deep request queue according to an embodiment.

Referring to FIG. 10, a deep request queue 1001 (e.g., capable of storing 128-256 entries) is provided, wherein a newly arrived request Req #0 can be looked up, and a prefetch request to the SSD can be generated early, before is newly arrived request pushed into the deep request queue 1001.

More specifically, upon receiving a data request Req #0 via a bus, e.g., a CXL memory bus, the data request Req #0 is provided to a hash generator 1011 before being pushed into the deep request queue 1001 or soon after being pushed into the deep request queue 1001.

For example, as illustrated in FIG. 10, the data request Req #0 is stored at a first position, e.g., the tail, in the deep request queue 1001. Thereafter, the data request Req #0 is accessed at the first position and a first lookup operation, i.e., an early prefetch operation, for the data request Req #0 is performed.

A bloom filter may be provided to pass a new request address through hash generator 1011, and the hashed address can be used for a quick device cache lookup hit/miss indication. For example, as illustrated in FIG. 10, the data request Req #0 is provided to the hash generator 1011 while a data request Req #255, which has moved to the head of the deep request queue 1001, is sent to a device cache lookup 1002.

The hash generator 1011 generates a hash value for the data request Req #0, and then an early cache lookup is performed by sending the hash value to a hash table lookup 1012. The hash table lookup 1012 compares the hash value to values in a hash table that correspond to data stored in the device cache. The hash table should be updated frequently to correspond to the device cache. Accordingly, if the hash table lookup 1012 results in a table hit at 1013, this indicates that that data for the data request Req #0 is likely already included in the device cache, increasing the likelihood that the device cache lookup 1002, i.e., a second lookup operation, for the data request Req #0 will result in a cache hit when the deep request queue 1001 is updated and the data request Req #0 progresses to the head of the deep request queue 1001.

However, if the hash table lookup 1012 results in a table miss at 1013, this indicates that that data for the data request Req #0 is likely not included in the device cache. In response, an SSD request can then be generated for the data request Req #0 and provided to an SSD request queue 1010.

Additionally, the SSD request for the data request Req #0 can be sent to an adaptive prefetch table 1009, such that a prefetch request may be generated for a predicted next page, e.g., as described above with reference to FIGS. 3 and 4.

As illustrated in FIG. 10, an arbiter 1005 may be provided to selectively provide the data requests and prefetch requests to the SSD request queue 1010 for subsequent retrieval from the SSD.

As described above, using the hash table lookup 1012 for an early cache lookup can increase the likelihood of a device cache hit, and hide some of the relatively long access latency of the SSD memory system. Additionally, using the hash table lookup 1012 for an early cache lookup may allow a prefetch operation to be performed sooner.

Figure 11:
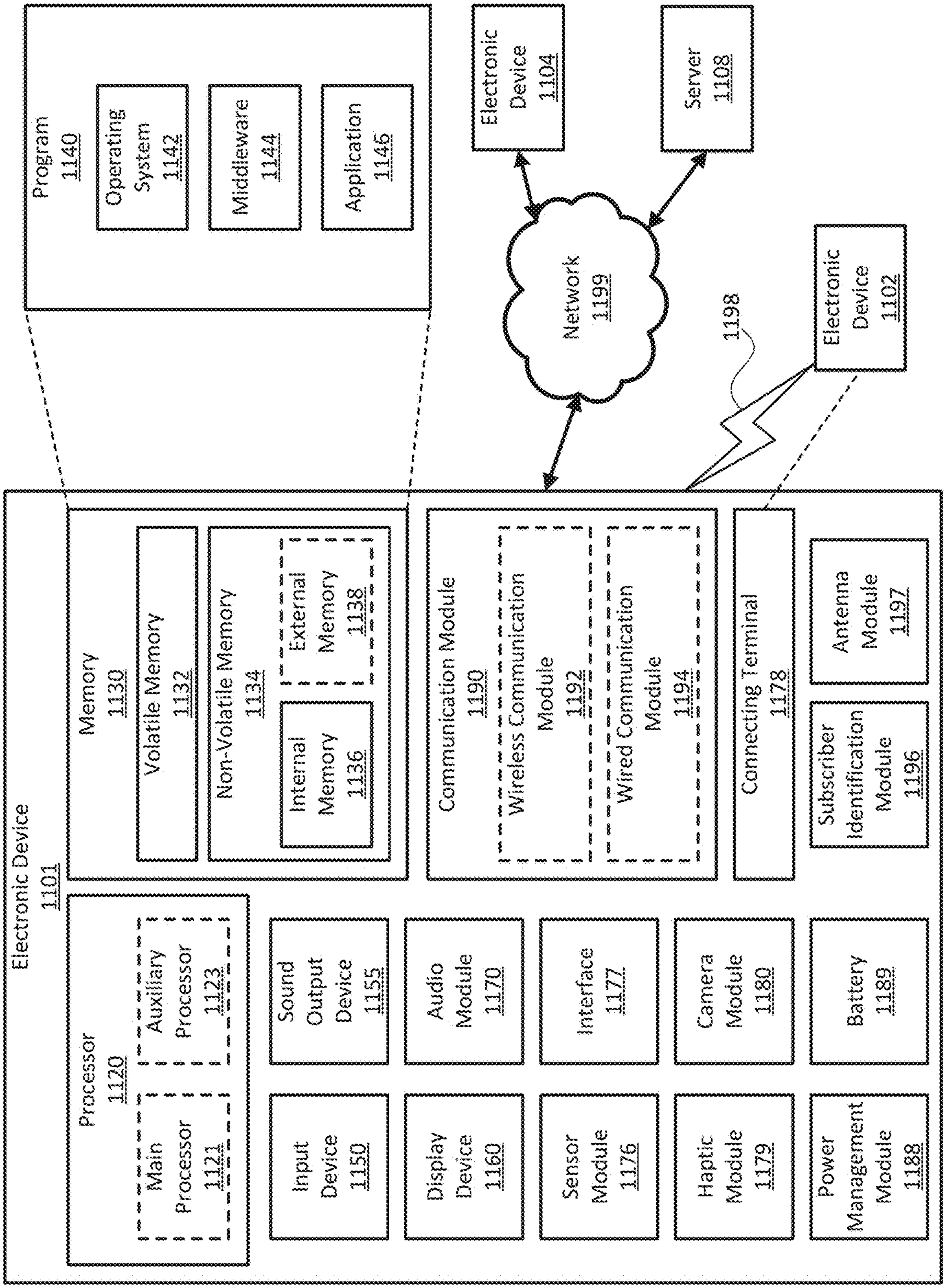
FIG. 11 is a block diagram illustrating an electronic device in a network environment, according to an embodiment.

FIG. 11 is a block diagram illustrating an electronic device in a network environment, according to an embodiment.

Referring to FIG. 11, the electronic device 1101, e.g., a mobile terminal including global positioning system (GPS) functionality, in the network environment 1100 may communicate with an electronic device 1102 via a first network 1198 (e.g., a short-range wireless communication network), or an electronic device 1104 or a server 1108 via a second network 1199 (e.g., a long-range wireless communication network). The electronic device 1101 may communicate with the electronic device 1104 via the server 1108. The electronic device 1101 may include a processor 1120, a memory 1130, an input device 1150, a sound output device 1155, a display device 1160, an audio module 1170, a sensor module 1176, an interface 1177, a haptic module 1179, a camera module 1180, a power management module 1188, a battery 1189, a communication module 1190, a subscriber identification module (SIM) 1196, or an antenna module 1197 including a global navigation satellite system (GNSS) antenna. In one embodiment, at least one (e.g., the display device 1160 or the camera module 1180) of the components may be omitted from the electronic device 1101, or one or more other components may be added to the electronic device 1101. In one embodiment, some of the components may be implemented as a single IC. For example, the sensor module 1176 (e.g., a fingerprint sensor, an iris sensor, or an illuminance sensor) may be embedded in the display device 1160 (e.g., a display).

The processor 1120 may execute, for example, software (e.g., a program 1140) to control at least one other component (e.g., a hardware or a software component) of the electronic device 1101 coupled with the processor 1120, and may perform various data processing or computations. As at least part of the data processing or computations, the processor 1120 may load a command or data received from another component (e.g., the sensor module 1176 or the communication module 1190) in volatile memory 1132, process the command or the data stored in the volatile memory 1132, and store resulting data in non-volatile memory 1134. The processor 1120 may include a main processor 1121 (e.g., a CPU or an application processor), and an auxiliary processor 1123 (e.g., a graphics processing unit (GPU), an image signal processor (ISP), a sensor hub processor, or a communication processor (CP)) that is operable independently from, or in conjunction with, the main processor 1121. Additionally or alternatively, the auxiliary processor 1123 may be adapted to consume less power than the main processor 1121, or execute a particular function. The auxiliary processor 1123 may be implemented as being separate from, or a part of, the main processor 1121.

For example, the main processor 1121 and/or the auxiliary processor 1123 may include one or more of an adaptive prefetch controller or a DRAM controller as described in FIGS. 3 and 4.

The auxiliary processor 1123 may control at least some of the functions or states related to at least one component (e.g., the display device 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to one embodiment, the auxiliary processor 1123 (e.g., an image signal processor or a communication processor) may be implemented as part of another component (e.g., the camera module 1180 or the communication module 1190) functionally related to the auxiliary processor 1123.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134. For example, the memory may include an SSD memory system including an adaptive prefetch table as described in the embodiments above, e.g., as illustrated in FIG. 3, FIG. 4, or FIG. 10.

The program 1140 may be stored in the memory 1130 as software, and may include, for example, an OS 1142, middleware 1144, or an application 1146.

The input device 1150 may receive a command or data to be used by other component (e.g., the processor 1120) of the electronic device 1101, from the outside (e.g., a user) of the electronic device 1101. The input device 1150 may include, for example, a microphone, a mouse, or a keyboard.

The sound output device 1155 may output sound signals to the outside of the electronic device 1101. The sound output device 1155 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 1160 may visually provide information to the outside (e.g., a user) of the electronic device 1101. The display device 1160 may include, for example, a display, a hologram device, or a projector and control circuitry to control a corresponding one of the display, hologram device, and projector. According to one embodiment, the display device 1160 may include touch circuitry adapted to detect a touch, or sensor circuitry (e.g., a pressure sensor) adapted to measure the intensity of force incurred by the touch.

The audio module 1170 may convert a sound into an electrical signal and vice versa. According to one embodiment, the audio module 1170 may obtain the sound via the input device 1150, or output the sound via the sound output device 1155 or a headphone of an external electronic device 1102 directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. The sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device 1102 directly (e.g., wiredly) or wirelessly. According to one embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device 1102. According to one embodiment, the connecting terminal 1178 may include, for example, an HDMI connector, a USB connector, an SD card connector, or an audio connector (e.g., a headphone connector).

The haptic module 1179 may convert an electrical signal into a mechanical stimulus (e.g., a vibration or a movement) or an electrical stimulus which may be recognized by a user via tactile sensation or kinesthetic sensation. According to one embodiment, the haptic module 1179 may include, for example, a motor, a piezoelectric element, or an electrical stimulator.

The camera module 1180 may capture a still image or moving images. According to one embodiment, the camera module 1180 may include one or more lenses, image sensors, image signal processors, or flashes.

The power management module 1188 may manage power supplied to the electronic device 1101. The power management module 1188 may be implemented as at least part of, for example, a power management integrated circuit (PMIC).

The battery 1189 may supply power to at least one component of the electronic device 1101. According to one embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor) and supports a direct (e.g., wired) communication or a wireless communication. According to one embodiment, the communication module 1190 may include a wireless communication module 1192 (e.g., a cellular communication module, a short-range wireless communication module, or a GNSS communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or a standard of the Infrared Data Association (IrDA)) or the second network 1199 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The antenna module 1197 may transmit or receive a signal or power to or from the outside (e.g., the external electronic device) of the electronic device 1101. According to one embodiment, the antenna module 1197 may include one or more antennas, and, therefrom, at least one antenna appropriate for a communication scheme used in the communication network, such as the first network 1198 or the second network 1199, may be selected, for example, by the communication module 1190 (e.g., the wireless communication module 1192). The signal or the power may then be transmitted or received between the communication module 1190 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 1101 and the external electronic device 1104 via the server 1108 coupled with the second network 1199. Each of the electronic devices 1102 and 1104 may be a device of a same type as, or a different type, from the electronic device 1101. All or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, or client-server computing technology may be used, for example.

One embodiment may be implemented as software (e.g., the program 1140) including one or more instructions that are stored in a storage medium (e.g., internal memory 1136 or external memory 1138) that is readable by a machine (e.g., the electronic device 1101). For example, a processor of the electronic device 1101 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 12:
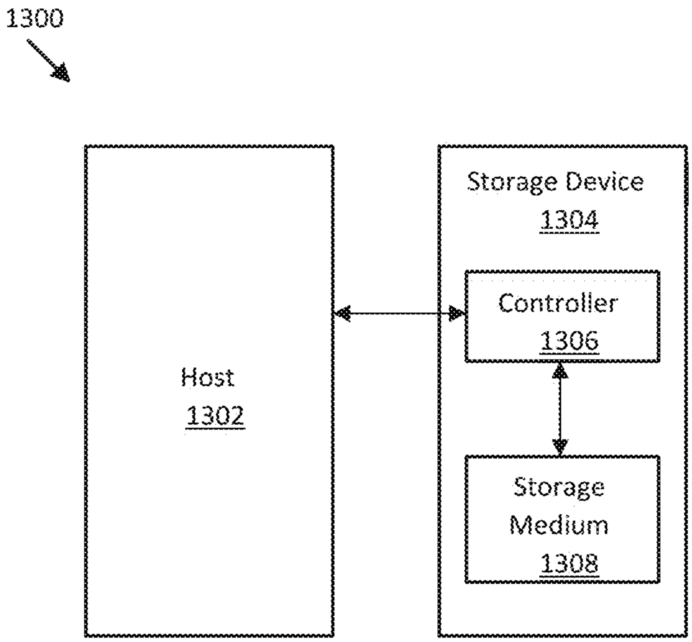
FIG. 12 illustrates a diagram of a storage system, according to an embodiment.

FIG. 12 illustrates a diagram of a storage system 1300, according to an embodiment. The storage system 1300 includes a host 1302 and a storage device 1304. Although one host and one storage device are depicted, the storage system 1300 may include multiple hosts and/or multiple storage devices, such as a RAID array. The storage device 1304 may be an SSD, a universal flash storage (UFS), etc. The storage device 1304 includes a controller 1306 and a storage medium 1308 connected to the controller 1306. The controller 1306 may be an SSD controller, a UFS controller, etc. The storage medium 1308 may include a volatile memory, a non-volatile memory, or both, and may include one or more flash memory chips (or other storage media). The controller 806 may include one or more processors, one or more error correction circuits, one or more field programmable gate arrays (FPGAs), one or more host interfaces, one or more flash bus interfaces, etc., or a combination thereof. The controller 1306 may be configured to facilitate transfer of data/commands between the host 1302 and the storage medium 1308. The host 1302 sends data/commands to the storage device 1304 to be received by the controller 1306 and processed in conjunction with the storage medium 1308. As described herein, the methods, processes and algorithms may be implemented on a storage device controller, such as controller 1306. Arbiters, command fetchers, and command processors may be implemented in the controller 1306 of the storage device 1304, and the processors and buffers may be implemented in the host 1302.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for performing early prefetch in a memory system, the method comprising:

receiving a data request including an address of a data page stored in a memory device;

storing the data request at a first position in a request queue;

accessing the data request stored at the first position and performing a first lookup operation for the data request;

updating the request queue, which includes moving the data request stored at the first position to a second position in the request queue; and accessing the data request stored at the second position and performing a second lookup operation for the data request.

2. The method of claim 1, wherein performing the first lookup operation for the data request comprises:

generating a hash value of the address of the data page; and searching for the hash value in a hash table including a plurality of hash values corresponding to data stored in a device cache.

3. The method of claim 2, further comprising:

generating a request for data at the address of the data page stored in the memory device, based on a search miss for the hash value in the hash table; and sending the request to the memory device.

4. The method of claim 3, further comprising:

receiving, from the memory device, the data at the address of the data page stored in the memory device; and storing the received data in the device cache.

5. The method of claim 3, further comprising sending the address of the data page to an adaptive prefetch table, wherein the adaptive prefetch table includes an entry for the data page, and wherein with the entry for the data page includes an address of a predicted next page, and a weight factor of the predicted next page.

6. The method of claim 5, further comprising performing a third lookup operation using the adaptive prefetch table, to determine whether a prefetch operation should be performed based on the data request.

7. The method of claim 6, further comprising performing the prefetch operation for the predicted next page, based on the weight factor of the predicted next page being greater than or equal to a prefetch threshold.

8. The method of claim 7, further comprising:

generating a prefetch data request for the address of the predicted next page; and sending the prefetch data request to the memory device.

9. The method of claim 8, further comprising:

receiving, from the memory device, data for the address of the predicted next page; and storing the received data in a prefetch cache.

10. The method of claim 1, wherein performing the second lookup operation for the data request comprises performing a device cache lookup for the data request.

11. The method of claim 1, wherein the first position in the request queue is located at a tail of the request queue, and wherein the second position in the request queue is located at a head of the request queue.

12. A memory system, comprising:

a memory device;

a request queue; and a processor configured to:

receive a data request including an address of a data page stored in the memory device, store the data request at a first position in the request queue, access the data request stored at the first position and perform a first lookup operation for the data request, update the request queue, which includes moving the data request stored at the first position to a second position in the request queue, and access the data request stored at the second position and perform a second lookup operation for the data request.

13. The memory system of claim 12, further comprising:

a device cache;

a hash generator; and a hash lookup table including a plurality of hash values corresponding to data stored in the device cache, wherein the processor is further configured to perform the first lookup operation for the data request by:

receiving, from the hash generator, a hash value of the address of the data page, and searching for the hash value in the hash lookup table.

14. The memory system of claim 13, wherein the processor is further configured to:

generate a request for data at the address of the data page stored in the memory device, based on a search miss for the hash value in the hash table, and send the request to the memory device.

15. The memory system of claim 14, wherein the processor is further configured to:

receive, from the memory device, the data at the address of the data page stored in the memory device, and store the received data in the device cache.

16. The memory system of claim 14, wherein the processor is further configured to send the address of the data page to an adaptive prefetch table, wherein the adaptive prefetch table includes an entry for the data page, and wherein the entry for the data page includes an address of a predicted next page, and a weight factor of the predicted next page.

17. The memory system of claim 16, wherein the processor is further configured to perform a third lookup operation using the adaptive prefetch table, to determine whether a prefetch operation should be performed based on the data request.

18. The memory system of claim 17, wherein the processor is further configured to perform the prefetch operation for the predicted next page, based on the weight factor of the predicted next page being greater than or equal to a prefetch threshold.

19. The memory system of claim 18, wherein the processor is further configured to:

generate a prefetch data request for the address of the predicted next page; and send the prefetch data request to the memory device.

20. The memory system of claim 19, further comprising a prefetch cache, wherein the processor is further configured to:

receive, from the memory device, data for the address of the predicted next page, and store the received data in the prefetch cache.

21. The memory system of claim 12, wherein the processor is further configured to perform the second lookup operation for the data request by performing a device cache lookup for the data request.

22. The memory system of claim 12, wherein the first position in the request queue is located at a tail of the request queue, and wherein the second position in the request queue is located at a head of the request queue.

* * * * *